Figure 40:
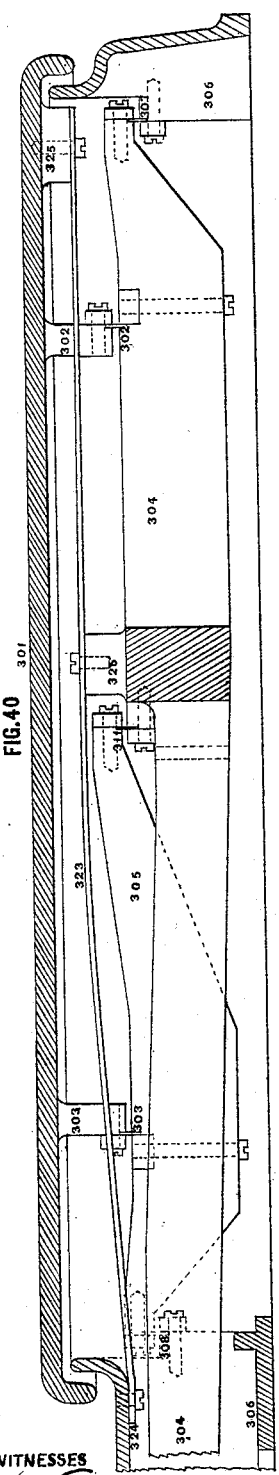

(No Model.) 2 Sheets—Sheet 1.

A. H. EMERY.
PLATFORM SCALE.

No. 278,904. Patented June 5, 1883.

WITNESSES
Walter Allen
Harry E. Knight

INVENTOR
Albert H. Emery
By Knight Bros
Atty.

(No Model.) 2 Sheets—Sheet 2.
A. H. EMERY.
PLATFORM SCALE.
No. 278,904. Patented June 5, 1883.
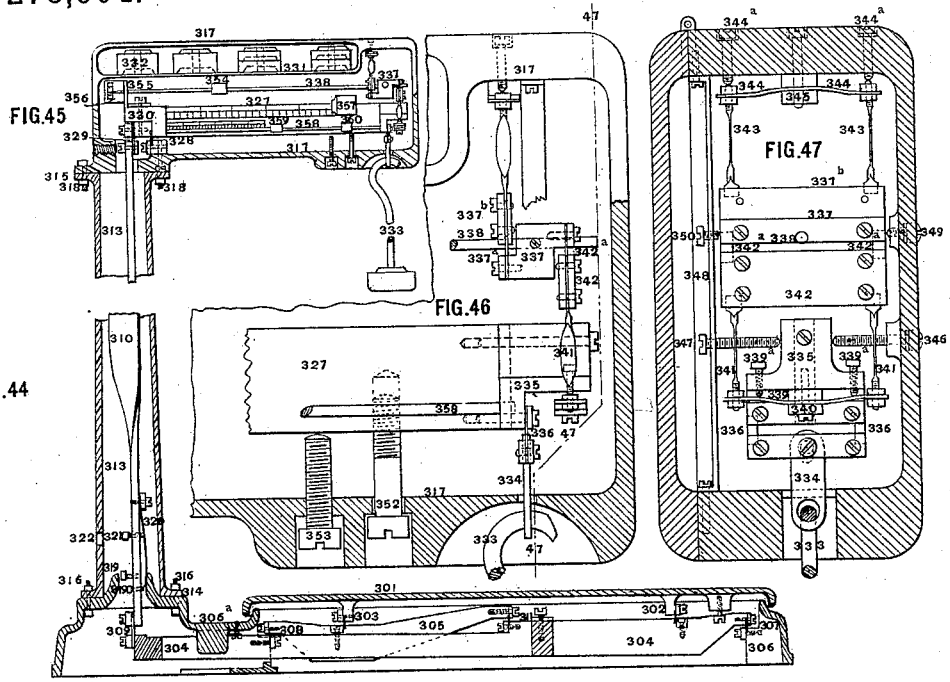
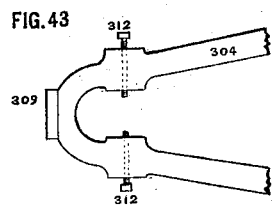
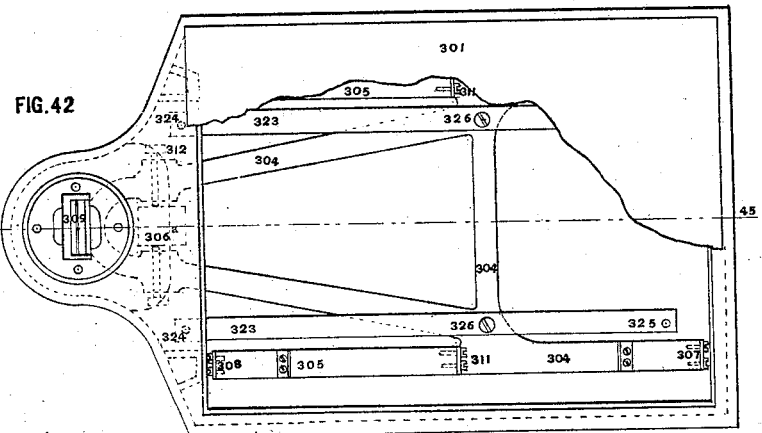
WITNESSES
Walter Allen
Harry E Knight
INVENTOR
Albert H. Emery
Knight Bros

UNITED STATES PATENT OFFICE.

ALBERT H. EMERY, OF NEW YORK, N. Y., ASSIGNOR TO THE EMERY SCALE COMPANY, OF STAMFORD, CONNECTICUT.

PLATFORM-SCALE.

SPECIFICATION forming part of Letters Patent No. 278,904, dated June 5, 1883.

Application filed February 5, 1881. (No model.)

*To all whom it may concern:*

Be it known that I, ALBERT H. EMERY, of the city, county, and State of New York, have invented certain new and useful Improvements in Scales, of which the following is a specification.

This invention relates to platform-scales. The platform is supported by a main lever, in form approximating to the letter A, and secondary parallel levers connected therewith. The attachment of the levers to the bed, to the platform, and to each other is by thin flexible plates. The platform and levers are stayed longitudinally by flexible plates connected at their respective ends to the platform and to the bed and intermediately to the levers. The main lever is provided with stop-screws to prevent its lateral movement. It communicates with the weigh-beam through a bar connected to it by a flexible thin plate, and working within a hollow pillar flanged for its attachment to the bed and to the weigh-beam case. The connecting-bar is checked against horizontal motion by stop-screws set in it, the bed-frame, or the pillar. The weigh-beam case is constructed of cast-iron flanged for attachment to the pillar, and has suitable supports for the fulcrum attachments of the beam, and of a secondary beam or indicator-rod working in connection therewith and having greater angular motion. The weight end of the main beam and the fulcrum of the indicator are connected together and the said fulcrum to the main frame through the medium of springs which are strained to the proper maximum load of the scale, but adapted to yield under excessive loading or under sudden shocks in either direction. The vertical motion of the main beam is limited in each direction by stop-screws applied within recesses in the beam-case and tapped into the said case and the beam, respectively. The lateral motion of the beam and indicator is also checked by stop-screws.

Heretofore platform-scales have had their platforms and the loads to be weighed thereon supported sometimes by hydraulic weighing apparatus, but usually upon levers connected by links, struts, knife-edges, &c., through which levers the reduced loads are carried to the weigh-beam or springs to measure their loads, or they have rested directly on coiled springs, or spring plates or bars, which, by their yielding or bending, resist the load movement until such resistance of yielding or bending has used up or balanced the force of the load which caused it. Instead of knife-edges for fulcrums, I prefer to make use of thin flexible plates, by which I am enabled to adopt very exact relations of fulcrum distances, and which plates are so thin, flexible, and elastic and have such slight motions that, while having no friction, they offer very slight resistance to motion, which resistance is perfectly elastic and causes no irregularity in weighing.

Figure 41:
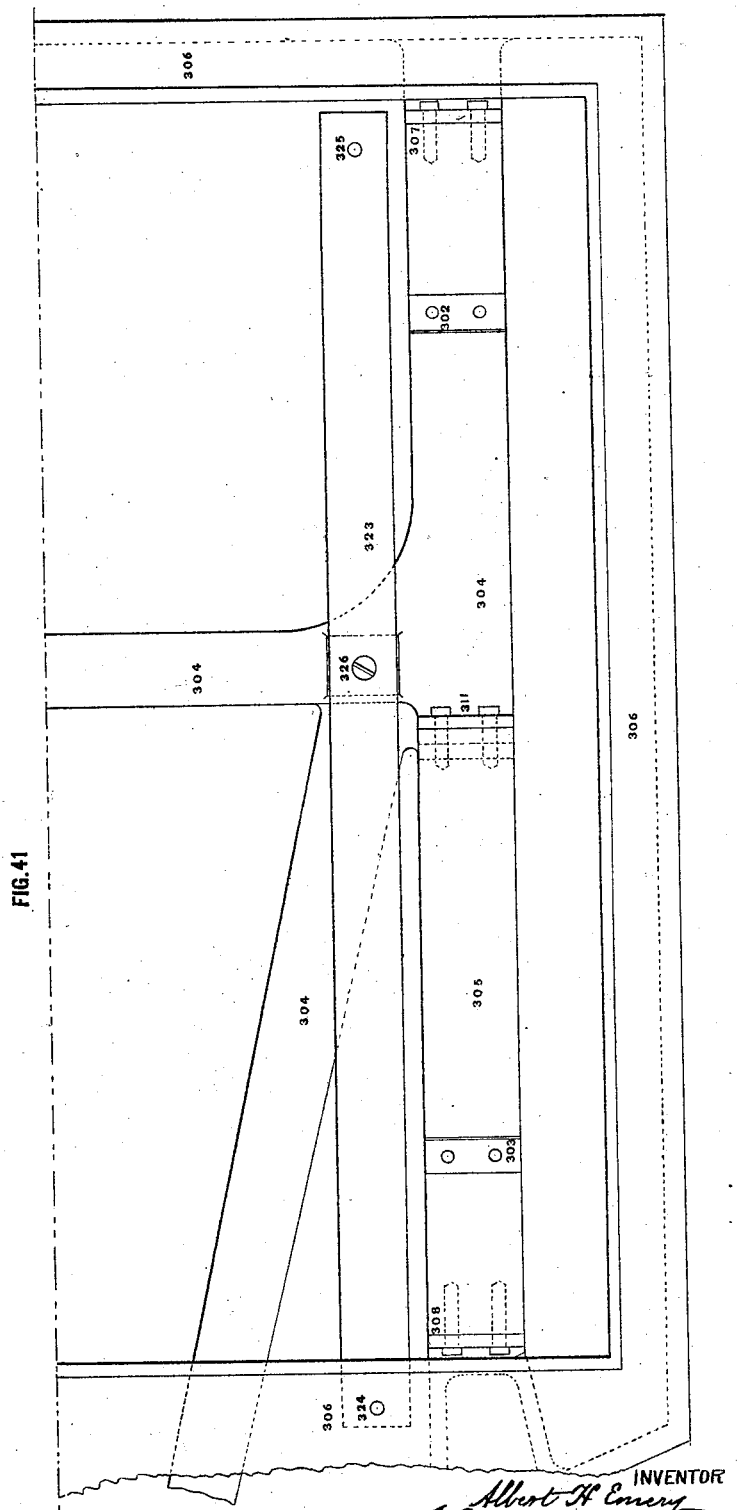

In the accompanying drawings the invention is represented in eight views, numbered 40 to 47, inclusive. Figure 40 is a vertical longitudinal section of the platform, bed, and levers. Fig. 41 is a plan of a part of the bed and levers with the platform removed. Fig. 42 is a plan of the lower part of the scale on a smaller scale, part of the platform being broken away. Fig. 43 is a plan of the free end of the main platform-lever, showing the adjustable stop-screws. Fig. 44 is a vertical longitudinal section of the lower part of the entire scale. Fig. 45 is an elevation of the upper part thereof, partly in section. Fig. 46 is a vertical longitudinal section, on a larger scale, of the weight end of the weigh-beam case, showing the end of the beam and its attachments in elevation. Fig. 47 is a transverse section in the planes indicated by the lines 47, Fig. 46.

The platform 301 is shown connected by downwardly-projecting lugs and flexible plates 302 303 with the main lever 304 and secondary levers 305, fulcrumed to the bed 306 by flexible plates at 307 and 308, respectively. The main lever is of a form approximating to that of the letter A, the diverging ends being attached to the bed by the fulcrum-plates 307, while the convergent or united end is attached by a flexible plate, 309, to the lower end of the rod or bar 310, from which pressure and motion in either direction are communicated to the weigh-beam, as hereinafter described.

The secondary levers 305 are parallel, and are attached by flexible plates 311 to the main lever at or near the mid-length of the platform. It will now appear that as the relative distances between the points 307, 302, and 311 are equal to the distances between the points 308, 303, and 311, a weight on either end or on any part of the platform will have the same effect on the main lever 304, through which the pressure is communicated to the rod or bar 310.

312 are stop-screws tapped into the lever 304, as shown in Figs. 42 and 43, and abutting against a lug, 306ª, Figs. 42 and 44, which projects downward from the bed between the points of said screws, to keep the free end of the lever from lateral motion beyond the elastic limits of the flexible fulcrum and stay plates.

The pillar 313 is constructed with flanges 314 315 at bottom and top. By the flange 314 and bolts 316 it is fastened to the bed 306. To the flange 315 the weigh-beam case 317 is secured by bolts 318.

319 represents adjustable stop-screws tapped into the rod or bar 310 near its lower end, and abutting against a flange on the bed, to prevent the bar from moving horizontally beyond the elastic limit of the connecting-plate 309. Said screws may, if preferred, be set adjustably in the bed-frame or in the pillar, to form stops for the bar. Flexible stay-plates may, if preferred, be substituted for these stop-screws, as hereinafter described.

In Figs. 44 and 45 the pillar 313 and bar 310 are shown as broken and the upper part of the scale revolved ninety degrees from its position in practice to show a front view of the weigh-beams and their case and connections.

320 is an elastic friction-brake, bearing against the flange of the bed or against the inside of the pillar or other stationary part, and adjusted in pressure by a set-screw, 321, to check the too free vertical movements of the parts, as may be necessary to bring the indicator quickly to rest. An aperture is provided in the pillar at 322, to admit an instrument for turning the set-screw 321.

To secure the platform from longitudinal movement without preventing its free vertical play, flexible bars 323, Figs. 40, 41, 42, are provided, attached at 324 to the bed, at 325 to lugs projecting downward from the platform, and at 326 to the central part of the main platform-lever 304. These flexible bars or springs are omitted in Fig. 44.

The weigh-beam 327 is supported within its case by a flexible fulcrum-plate, 328, and is connected to the rod or bar 310 by a flexible tension-plate, 329, both attached to the fulcrum-bracket 330, constituting the heel of the beam. The beam-case is constructed with a shelf, 331, for the reception of weights 332, to be applied as required to the suspension-rod 333, in customary manner. The hanger 334 of the rod 333 is preferably connected to the bracket 335 at the extremity of the beam by thin flexible plates 336, Figs. 46 and 47.

Elastic connections are provided between the weight end of the beam 327 and the bracket 337 of the indicator-rod 338, and between the indicator-rod bracket and the stationary frame or case, to take up any sudden shock or impulse in either direction, so as to prevent injury or violence to the parts. In this illustration the said flexible connections are constructed as follows:

339 is a plate-spring, secured at its center by a screw-clamp, 340, to the bracket 335 at the end of the weigh-beam, and extending laterally beyond said bracket, so as to receive at its ends rods or plates 341, which, through the medium of clamp-plates 342 and flexible plates 342ª, connect it to the rear part of the indicator-rod fulcrum-bracket 337. The front of the fulcrum-bracket 337 is suspended by thin plates 337ª, clamp-plates 337ᵇ, and rods or plates 343 to the extremities of a spring, 344, which is fastened, by a clamp, 345, at its center, to the stationary case.

Set-screws 344ª are employed to keep a tension on the spring equal to the maximum weight which will be sustained by the indicator-rod bracket in the proper use of the scale. The spring 339 exerts downward strain on the hangers 341 342 343 in opposition to the upward strain of the springs 344. Set-screws 339ª, bearing against the spring 339, afford a partially rigid connection between the weigh-beam and indicator while the scale is in proper operation. A sudden downward shock on the indicator-rod or on the weight end of the beam, or the sudden removal of a heavy load from the platform, will cause the springs 344 to yield to afford time for the movement of the various parts without injurious strain. The sudden dropping of a load on the platform or removal of a weight from the rod 333, causing a more sudden upward motion of the weight end of the beam than the indicator can respond to, will temporarily separate the points of the screws 339ª from the spring 339, the said spring keeping the hangers 341 taut till the indicator has time to move, and obviating the buckling of the plates 342ª.

A stop-screw, 346, tapped into the back of the case, and a similar screw, 347, in front, tapped into a vertical bar, 348, being set in close proximity to the bracket 335, secure the beam 327 against lateral play. Shorter screws 349 350 are employed to stop the indicator-rod bracket 337 against lateral play.

The vertical movement of the weigh-beam 327 is confined within proper limits by set-screws 352 353 passing through apertures in the case beneath it. The screw 352, being passed loosely through the case and tapped into the beam, limits the upward movement of the beam by contact of the screw-head with the case. The screw 353, being tapped into the case, limits the descent of the beam by its contact with the screw-point. The heads of the screws are preferably inclosed within recesses in the beam-case, as shown; but this is not essential.

The indicator-rod carries a balancing-weight, 354, and works within a guide, 355, and in front of an indicator-plate, 356, which guide and indicator may be made in one piece and attached to the heel-bracket 330 of the beam, as described in another application.

357 represents a sliding weight used in connection with the graduations shown at the upper edge of the beam 327 for ordinary weighing.

To the beam is attached a rod, 358, carrying a smaller weight, 359, for fractional weighing, in connection with a second series of graduations on the beam. The weight-rod 358 also carries one or more balancing and tare weights, 360.

The thin fulcrum-plates employed, as above described, to connect the scale-levers are not intended to operate as resisting-springs. They are adapted to bend without appreciable resistance; but in operation they bend to a very slight and inappreciable extent. The invention is thus radically different from any in which scale-levers are connected by spring-bars adapted to sustain the load by their resilience.

Whatever novel subject-matter I have set forth and not claimed or attempted to claim herein I have claimed or attempted to claim in other applications or have reserved to be claimed in future original applications.

The following is here claimed as new:

1. The combination of the platform and its levers with thin flexible plates 302 303, clamped to and directly connecting the said platform and levers, substantially as and for the purposes set forth.

2. The combination of the flexible stay-plates 323 with the platform 301, platform-lever 304, and the frame or bed 306, substantially as described.

3. The combination, with the platform-lever 304, of the adjustable stop-screws 312, abutting against the frame or one or more lugs thereon, as and for the purposes set forth.

4. In combination with either or both levers 304 305, and with the frame or bed of the scale 306, the thin flexible plate fulcrums and their clamps, said flexible plate fulcrums offering such slight resistance that a small fraction of the full load of the scale will deflect the levers to the full extent of their permitted movement.

5. In a platform-scale, the lever or levers having thin flexible plate fulcrums, in combination with weighing mechanism extraneous to said fulcrums.

6. In a scale, a platform lever or levers firmly connected to the weigh-beam and secured against relative vertical motion at the points of connection by a rod or rods and thin plates, substantially as described.

7. The combination of the A-shaped platform-lever 304 and parallel secondary platform-levers 305, connected by thin flexible plate fulcrums offering such slight resistance that a small fraction of the full load of the scale will deflect the levers to the full extent of their permitted movement, substantially as set forth.

8. The doubly-flanged hollow pillar 313, constructed as shown, and combined with the bed 306 and cast-metal weigh-beam case 317, substantially as and for the purposes specified.

9. In combination with the flanged pillar 313, the weigh-beam case 317, weigh-beam 327, and indicator-rod 338, with suitable connections, substantially as set forth.

10. The combination of the adjustable stop-screws 319 with the tension bar or plate 310 and any suitable stop or abutment, substantially as and for the purposes set forth.

11. A weigh-beam or indicator-rod suspended by springs strained to the proper maximum load, and adapted to yield under an excessive or sudden shock, substantially as set forth.

12. In combination with a scale-beam and a secondary beam or indicator-rod connected thereto by hangers, the spring 339, adapted to keep said hangers constantly under tension and compensate for a sudden upward movement of the beam, substantially as set forth.

13. The two adjustable stop-screws 353 352, screwed into the case or frame and the weigh-beam, respectively, substantially as and for the purposes set forth.

14. The adjustable stops 346 347 349 350, to prevent lateral motion of the scale-beam or indicator-rod, substantially as set forth.

ALBERT H. EMERY.

Witnesses:
OCTAVIUS KNIGHT,
MAHLON RANDOLPH.